(12) United States Patent  
Carlson et al.

(10) Patent No.: US 9,795,158 B2  
(45) Date of Patent: Oct. 24, 2017

(54) POPCORN MAKER

(71) Applicant: Hamilton Beach Brands, Inc., Glen Allen, VA (US)

(72) Inventors: Drew Carlson, Henrico, VA (US); Derek A McCullough, Henrico, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 104 days.

(21) Appl. No.: 14/201,179

(22) Filed: Mar. 7, 2014

(65) Prior Publication Data

US 2015/0250215 A1    Sep. 10, 2015

(51) Int. Cl.
*A23L 1/18*    (2006.01)
*A23L 7/187*   (2016.01)

(52) U.S. Cl.
CPC .................. *A23L 7/187* (2016.08)

(58) Field of Classification Search
CPC ........ A23L 1/18; A23L 1/1807; A23L 1/1812; A23L 1/1815; A23L 7/183; A23L 7/187
See application file for complete search history.

(56) References Cited

U.S. PATENT DOCUMENTS

| | | | | |
|---|---|---|---|---|
| 1,525,966 A | * | 2/1925 | Vickers | A23L 7/187 366/237 |
| 1,974,611 A | * | 9/1934 | Gundelfinger | A23L 7/187 366/325.2 |
| 1,978,173 A | * | 10/1934 | Spier | A23L 7/187 366/142 |
| 2,113,041 A | * | 4/1938 | Benson | A23L 7/187 220/293 |
| 2,150,888 A | * | 3/1939 | Barnard | A23L 7/187 16/429 |
| 2,536,298 A | * | 1/1951 | Manley | A23L 1/1815 99/323.9 |
| 2,637,656 A | * | 5/1953 | Baunach | A23L 7/187 99/323.8 |
| 2,650,736 A | * | 9/1953 | Curry | A23L 7/187 206/514 |
| 2,654,823 A | * | 10/1953 | Altemiller | A23L 1/1815 219/436 |
| 3,570,388 A | * | 3/1971 | Gottlieb | A23L 7/187 99/323.5 |

(Continued)

*Primary Examiner* — David Angwin  
*Assistant Examiner* — John J Norton  
(74) *Attorney, Agent, or Firm* — Alexander D. Raring

(57) ABSTRACT

A kitchen appliance for popping popcorn comprises a housing and a popping mechanism. The housing comprises a bottom housing portion adapted to sit stably upon a surface during operation of the appliance and adapted to receive popcorn that has been popped by the appliance and a top housing portion adapted to sit stably upon the bottom housing portion during operation of the appliance and selectively removable from the bottom housing portion. The popping mechanism heats unpopped popcorn kernels in order to cause the unpopped popcorn kernels to pop. The popping mechanism is affixed within the top housing portion such that, when the top housing portion is selectively removed from the bottom housing portion and placed upright on a surface, the popping mechanism does not contact the surface.

13 Claims, 16 Drawing Sheets

(56) References Cited

U.S. PATENT DOCUMENTS

| | | | | |
|---|---|---|---|---|
| 3,611,910 A * | 10/1971 | Hughes | | A23L 7/187 |
| | | | | 206/45.2 |
| 3,641,916 A * | 2/1972 | McDevitt | | G07F 17/0078 |
| | | | | 99/323.7 |
| 3,666,499 A * | 5/1972 | Isnor | | A23L 7/187 |
| | | | | 220/202 |
| 3,701,312 A * | 10/1972 | Martin | | A23L 7/187 |
| | | | | 99/323.5 |
| 3,786,740 A * | 1/1974 | Martin | | A23L 7/187 |
| | | | | 99/323.8 |
| 4,563,561 A * | 1/1986 | Vaeth | | A47J 36/027 |
| | | | | 219/732 |
| 4,573,401 A * | 3/1986 | Goodlaxson | | A23L 7/187 |
| | | | | 99/323.5 |
| 4,649,263 A * | 3/1987 | Goodlaxson | | A23L 7/187 |
| | | | | 219/436 |
| 5,421,253 A * | 6/1995 | Rehmeyer | | A23L 7/187 |
| | | | | 99/323.5 |
| 5,481,962 A * | 1/1996 | Tedesco | | A47J 37/0623 |
| | | | | 126/21 A |
| 5,694,830 A * | 12/1997 | Hodgson | | A23L 1/1815 |
| | | | | 99/323.7 |
| 6,374,727 B1 * | 4/2002 | Cretors | | A23L 1/1815 |
| | | | | 366/185 |
| D512,598 S | 12/2005 | Shore | | |
| D607,260 S | 1/2010 | Lam | | |
| D640,496 S | 6/2011 | Lam | | |
| D640,892 S | 7/2011 | Lam | | |
| 2004/0074397 A1 * | 4/2004 | Calhoun | | A23L 7/187 |
| | | | | 99/323.5 |
| 2004/0103793 A1 * | 6/2004 | Kurosawa | | A23L 1/1815 |
| | | | | 99/323.5 |
| 2006/0042472 A1 * | 3/2006 | Shore | | A23L 1/1815 |
| | | | | 99/323.5 |
| 2007/0056448 A1 * | 3/2007 | Kernan | | A23L 1/1812 |
| | | | | 99/323.5 |
| 2008/0223220 A1 * | 9/2008 | Peng | | A23L 7/187 |
| | | | | 99/323.5 |
| 2010/0206781 A1 * | 8/2010 | White | | B07B 1/4681 |
| | | | | 209/680 |
| 2011/0274804 A1 * | 11/2011 | Barrows | | A23L 1/18 |
| | | | | 426/449 |
| 2012/0085242 A1 * | 4/2012 | Lam | | A23L 1/1815 |
| | | | | 99/323.7 |
| 2015/0050406 A1 * | 2/2015 | Mastroianni | | A23L 1/1812 |
| | | | | 426/520 |

* cited by examiner

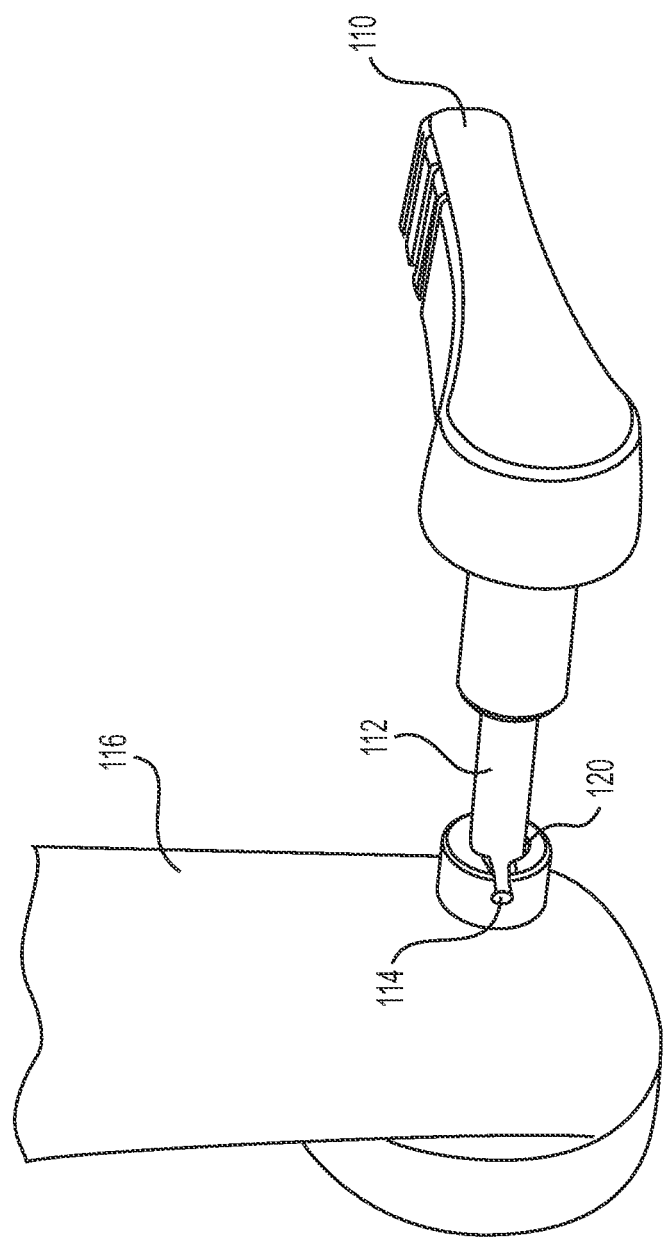

POPCORN MAKER

BACKGROUND OF THE DISCLOSURE

The present disclosure relates generally to a kitchen appliance for popping popcorn.

Popcorn makers are well known. There are several different types of popcorn makers, which all work by heating unpopped popcorn kernels until the kernels pop. For example, hot air popcorn poppers blow hot air up through the kernels. So-called electric popcorn popper feature a heated circular tray with a powered stirring arm. Corn kernels and oil are placed in the tray and covered. A heater heats the tray and oil until the kernels pop. Hot air and electric popcorn poppers are popular for home use.

Another type of popcorn maker is the kettle popcorn popper. Kettle popcorn poppers are capable of producing large amounts of popcorn, and thus are often used in movie theaters and other commercial environments. Kettle popcorn poppers feature a large enclosure or cabinet, typically with a large access door. A kettle is suspended inside the enclosure from the top of the enclosure. The kettle has a two-sided hinged lid, with each side of the lid hingedly affixed to the kettle near the center of the top opening of the kettle. Unpopped popcorn kernels and oil are placed in the kettle. Heat is applied to the unpopped popcorn kernels and oil via a heating element built into the kettle. A stir rod rotates within the kettle to stir the unpopped popcorn kernels as heat is applied. The stir rod is rotated by a motor positioned above the kettle in the top of the enclosure. The stir rod is connected to the motor via a vertical shaft that projects upward from the kettle and gearing between the upper end of the shaft and the motor.

As the popcorn kernels pop, the popped popcorn fills up the kettle and then pushes up one or both sides of the hinged lid and exits the top of the kettle, falling into the bottom of the enclosure. When the popcorn is substantially done popping, the kettle is rotated approximately 135-150 degrees about a horizontal axis via a dump lever to cause any popped popcorn or unpopped popcorn kernels remaining in the kettle to fall out of the kettle to the bottom of the enclosure. In order for the kettle to be able to rotate in this manner, the shaft must be able to disengage from the motor. This is typically accomplished by having the shaft connect to the motor via two or more gears that are adapted to engage when the kettle is upright and disengage when the kettle is rotated. This motor/gear/shaft arrangement adds significant complexity and cost to conventional kettle popcorn makers.

In addition to the complexity of the motor/gear/shaft arrangement of conventional kettle popcorn poppers, another significant shortcoming of conventional kettle popcorn poppers is the difficulty of cleaning. Conventional kettle popcorn poppers are difficult to clean for several reasons. Popcorn and unpopped kernels that remain in the bottom of the enclosure is difficult to remove. While the kettle can typically be removed for cleaning, fixed electrical connections to the kettle prohibit the kettle from being immersed in water or washed in a dishwasher. Additionally, the two-sided hinged lid restricts the opening of the kettle, even when the lid is open, thereby making cleaning inside the kettle difficult. Conventional kettle popcorn poppers typically have a stir rod which is fixed to the shaft and which therefore cannot readily be removed for cleaning. Kettle popcorn makers have not been popular for retail consumers for at least one of the above or other reasons. As such, kettle popcorn makers tend to be utilized in commercial spaces.

It has heretofore not been discovered how to create a kettle popcorn popper that is capable of popping popcorn without requiring an overly complex and costly structure and which is easy to clean as compared to a conventional kettle popcorn popper.

The kettle popcorn popper of the following disclosure overcomes at least one of the above or other shortcomings of conventional kettle popcorn makers.

BRIEF SUMMARY OF THE DISCLOSURE

Briefly stated, one aspect of the present disclosure is directed to a kitchen appliance for popping popcorn comprising an interior defined by a bottom housing portion and a top housing portion. The popcorn maker further comprising a popping mechanism for heating unpopped corn/popcorn kernels in order to cause the unpopped popcorn kernels to pop. The bottom housing portion comprises a floor and at least one sidewall, the floor and the at least one sidewall forming a cavity for receiving and holding popped popcorn. The top housing portion is supported by the bottom housing portion during use and selectively removable from the bottom housing portion. The popping mechanism is affixed within the top housing portion such that, when the top housing portion is selectively removed from the bottom housing portion and placed upright on a surface, the popping mechanism does not contact the surface. The popping mechanism is selectively pivotable between an upright position for receiving the unpopped popcorn kernels and holding the unpopped popcorn kernels while heat is applied to the inner kettle by the heating element and a dispensing position for emptying popped popcorn from the inner kettle into the bottom housing portion.

The popping mechanism may comprise an outer kettle that houses a heating element and a motor and an inner kettle selectively nested in the outer kettle and selectively removable from the outer kettle. The inner kettle is adapted to receive the unpopped popcorn kernels and hold the unpopped popcorn kernels while heat is applied to the inner kettle by the heating element in order to cause the unpopped popcorn kernels to pop.

The inner kettle may comprise a single hinged lid selectively movable between a closed position occluding an opening defined in a top of the inner kettle and an open position not occluding the opening defined in the top of the inner kettle. The hinged lid may occlude the opening defined in the top of the inner kettle when the popping mechanism is in its upright position and may not occlude the opening defined in the top of the inner kettle when the popping mechanism is in its dispensing position.

An opening may be defined in the top housing portion. The opening in the top housing portion is aligned with the opening defined in the top of the inner kettle when the popping mechanism is in its upright position, thereby enabling user access to the opening defined in the top of the inner kettle.

The popping mechanism may further comprise a rotatable shaft directly connected to the motor and aligned with a hole defined in a bottom of the inner kettle when the inner kettle is nested in the outer kettle. The popping mechanism may further comprise a stir rod selectively removably affixed to the rotatable shaft within the inner kettle such that the stir rod rotates within the inner kettle when (i) the inner kettle is nested in the outer kettle, (ii) the stir rod is affixed to the rotatable shaft, and (iii) the motor is rotating the rotatable shaft. A portion of the rotatable shaft projects through the hole defined in the bottom of the inner kettle when the inner kettle is nested in the outer kettle and/or a portion of the stir rod projects through the hole defined in the bottom of the inner kettle when the inner kettle is nested in the outer kettle and when the stir rod is affixed to the rotatable shaft. The stir rod may comprise a screw cap and one or more stir arms non-removably affixed to the screw cap.

The kitchen appliance may further comprise a power switch, internal electrical leadwires to carry electrical power from the power switch to the motor and heating element, an external power cord to carry electrical power from an electric power source to the power switch, and first and second support arms each comprising a proximal end and a distal end. The proximal ends of each of the first and second support arms being affixed to an inside surface of the top support housing. The popping mechanism is pivotably affixed to the distal ends of the first and second support arms. The electrical leadwires are routed from power switch to the motor and heating element through a channel defined in one of the first and second support arms.

The kitchen appliance further comprise a dump lever selectively rotatable by a user to selectively pivot the popping mechanism between the upright position and the dispensing position, the dump lever being selectively removably affixed to the popping mechanism via a snap-fit connection.

The top housing portion and the bottom housing portion may be shaped and sized such that the bottom housing portion, when inverted, is nestable on top of the top housing portion, when upright and/or such that the top housing portion, when inverted, is nestable within the bottom housing portion, when upright.

The inner kettle may not be electrically connected to any other components of the kitchen appliance.

Another aspect of the present disclosure is directed to a method of operating a kitchen appliance comprising adding a desired quantity of unpopped popcorn kernels to a kitchen appliance for popping popcorn. The kitchen appliance comprises a bottom housing portion, a top housing portion, a popping mechanism for heating unpopped popcorn kernels in order to cause the unpopped popcorn kernels to pop; and a dump lever selectively rotatable by a user to selectively pivot the popping mechanism between the upright position and the dispensing position. The bottom housing portion comprises a floor and at least one sidewall, the floor and the at least one sidewall forming a cavity for receiving and holding popped popcorn. The top housing portion is supported by the bottom housing portion during use and selectively removable from the bottom housing portion. The popping mechanism is affixed within the top housing portion such that, when the top housing portion is selectively removed from the bottom housing portion and placed upright on a surface, the popping mechanism does not contact the surface. The popping mechanism is selectively pivotable between (i) an upright position for receiving the unpopped popcorn kernels and holding the unpopped popcorn kernels while heat is applied to the inner kettle by the heating element and (ii) a dispensing position for emptying popped popcorn from the inner kettle into the bottom housing portion. The dump lever is selectively removably affixed to the popping mechanism via a snap-fit connection. The method further comprises activating the kitchen appliance, waiting until a desired amount of the unpopped popcorn kernels have popped, deactivating the kitchen appliance, rotating the dump lever to pivot the popping mechanism from the upright position to the dispensing position such that any popped popcorn remaining in the popping mechanism falls into the bottom housing portion, removing the top housing portion from the bottom housing portion, and serving the popped popcorn in the bottom housing portion.

The popping mechanism may comprise an outer kettle that houses a heating element and a motor and an inner kettle selectively nested in the outer kettle and selectively removable from the outer kettle. The inner kettle receives the unpopped popcorn kernels and holds the unpopped popcorn kernels while heat is applied to the inner kettle by the heating element in order to cause the unpopped popcorn kernels to pop. Adding a desired quantity of unpopped popcorn kernels to the kitchen appliance may comprise adding a desired quantity of unpopped popcorn kernels to the inner kettle.

The inner kettle may comprise only a single lid selectively movable between a closed position occluding an opening defined in a top of the inner kettle and an open position not occluding the opening defined in the top of the inner kettle. The hinged lid may occlude the opening defined in the top of the inner kettle when the popping mechanism is in its upright position and may not occlude the opening defined in the top of the inner kettle when the popping mechanism is in its dispensing position.

An opening may be defined in the top housing portion that is aligned with the opening defined in the top of the inner kettle when the popping mechanism is in its upright position, thereby enabling user access to the opening defined in the top of the inner kettle. Adding a desired quantity of unpopped popcorn kernels to the inner kettle may comprise adding a desired quantity of unpopped popcorn kernels to the inner kettle through the opening defined in the top housing portion.

The popping mechanism may further comprise a rotatable shaft directly connected to the motor and aligned with a hole defined in a bottom of the inner kettle when the inner kettle is nested in the outer kettle. The popping mechanism may further comprise a stir rod selectively removably affixed to the rotatable shaft within the inner kettle such that the stir rod rotates within the inner kettle when (i) the inner kettle is nested in the outer kettle, (ii) the stir rod is affixed to the rotatable shaft, and (iii) the motor is rotating the rotatable shaft. A portion of the rotatable shaft projects through the hole defined in the bottom of the inner kettle when the inner kettle is nested in the outer kettle and/or a portion of the stir rod projects through the hole defined in the bottom of the inner kettle when the inner kettle is nested in the outer kettle and when the stir rod is affixed to the rotatable shaft. The stir rod may comprise a screw cap and one or more stir arms non-removably affixed to the screw cap.

The appliance may further comprise a power switch, internal electrical leadwires to carry electrical power from the power switch to the motor and heating element, an external power cord to carry electrical power from an electric power source to the power switch, and first and second support arms each comprising a proximal end and a distal end. The proximal ends of each of the first and second support arms are affixed to an inside surface of the top support housing. The popping mechanism is pivotably affixed to the distal ends of the first and second support arms. The internal electrical leadwires are routed from power switch to the motor and heating element through a channel defined in one of the first and second support arms. Activating the kitchen appliance may comprise switching the power switch to an on position, and deactivating the kitchen appliance may comprise switching the power switch to an off position.

The inner kettle may not be electrically connected to any other components of the kitchen appliance. The method may further comprise removing the inner kettle from the kitchen appliance and washing the inner kettle in a dishwasher.

The method may further comprise either: inverting the bottom housing portion and nesting the inverted bottom housing portion on top of the top housing portion, or inverting the top housing portion and nesting the inverted top housing portion within the bottom housing portion.

Another aspect of the present disclosure is directed to a kitchen appliance for popping popcorn comprising A kitchen appliance for popping popcorn comprises a bowl for receiving, holding, and serving popped popcorn, a top housing portion supported by the bowl during use and selectively removable from the bowl and a popping mechanism for heating unpopped popcorn kernels in order to cause the unpopped popcorn kernels to pop. The popping mechanism is affixed within the top housing portion such that, when the top housing portion is selectively removed from the bowl and placed upright on a surface, the popping mechanism does not contact the surface. The popping mechanism is selectively pivotable between an upright position for receiving the unpopped popcorn kernels and holding the unpopped popcorn kernels while heat is applied to the inner kettle by the heating element and a dispensing position for emptying popped popcorn from the inner kettle into the bowl.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 15A is a perspective view of the dump lever of the kitchen appliance of FIG. 1, separated from the housing, in an engaged position.

DETAILED DESCRIPTION OF THE DISCLOSURE

Figure 1:
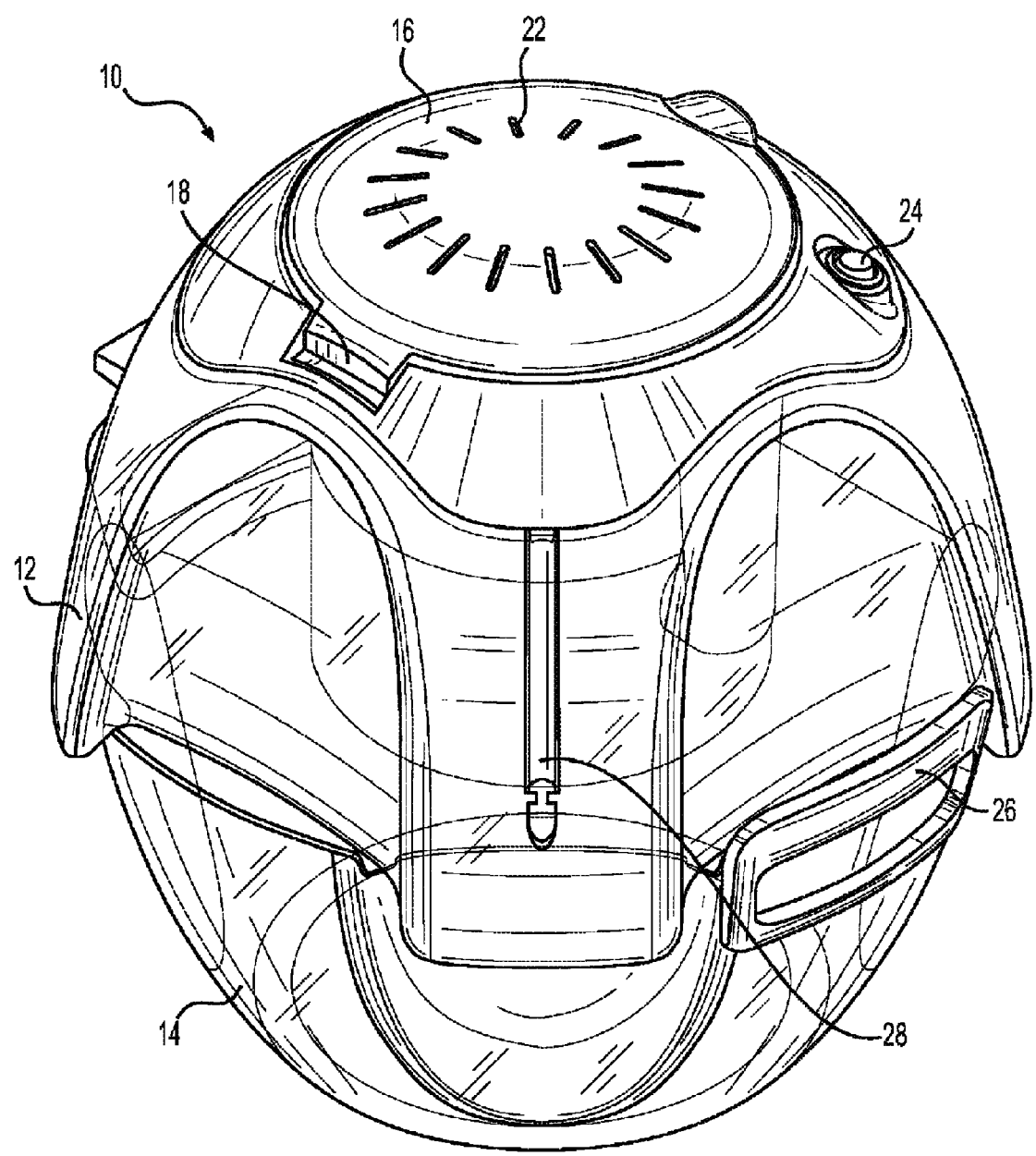
FIG. 1 is a rear perspective view of a kitchen appliance for popping popcorn, according to one embodiment of the present disclosure.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-15 illustrate a kitchen appliance 10 in accordance with a preferred embodiment of the present disclosure. The kitchen appliance 10 is intended or designed for making ("popping") popcorn and for serving the popped popcorn.

Figure 2:
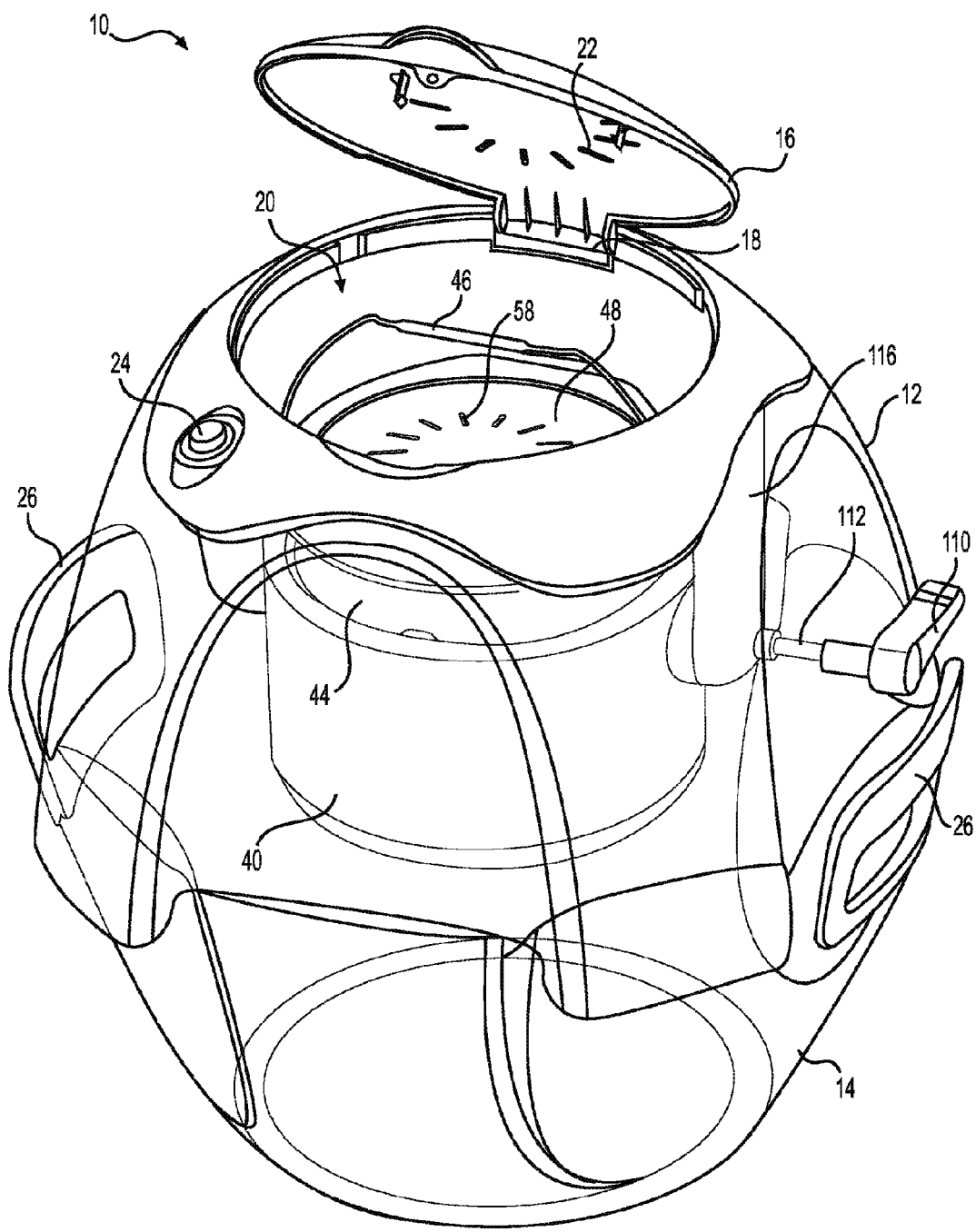
FIG. 2 is a front perspective view of the kitchen appliance of FIG. 1.
Figure 3:
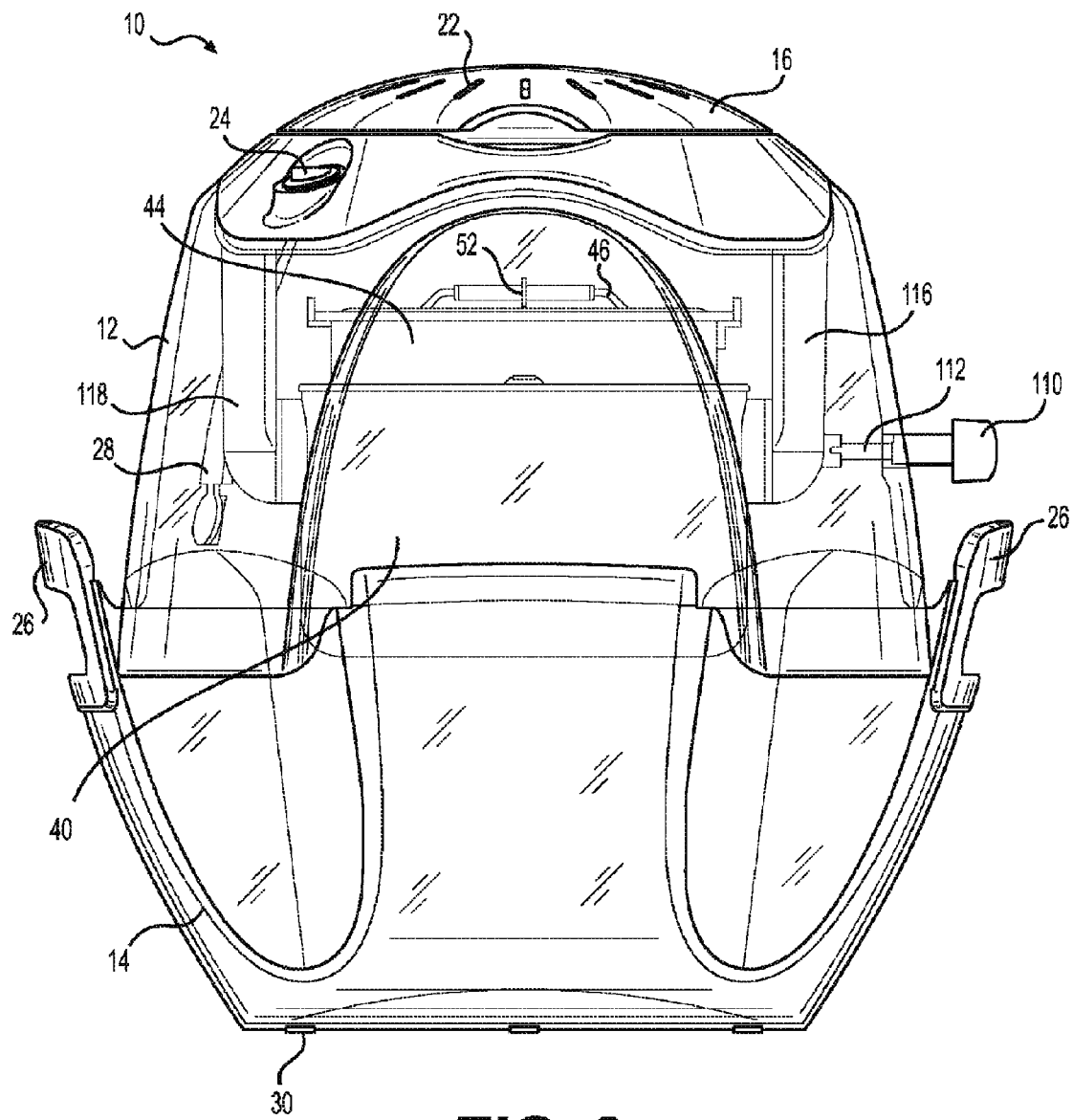
FIG. 3 is front view of the kitchen appliance of FIG. 1.
Figure 4:
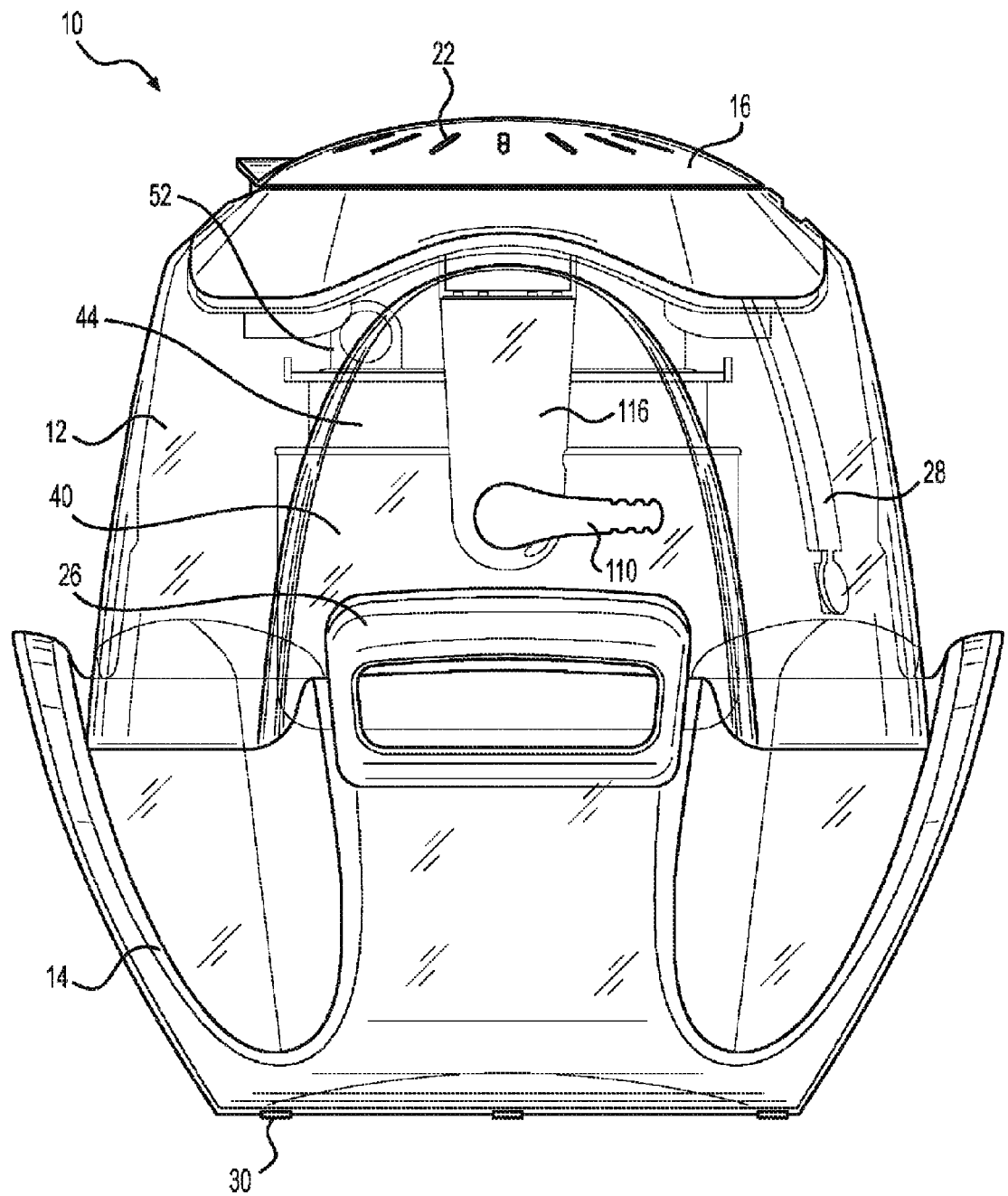
FIG. 4 is a right side view of the kitchen appliance of FIG. 1.
Figure 5:
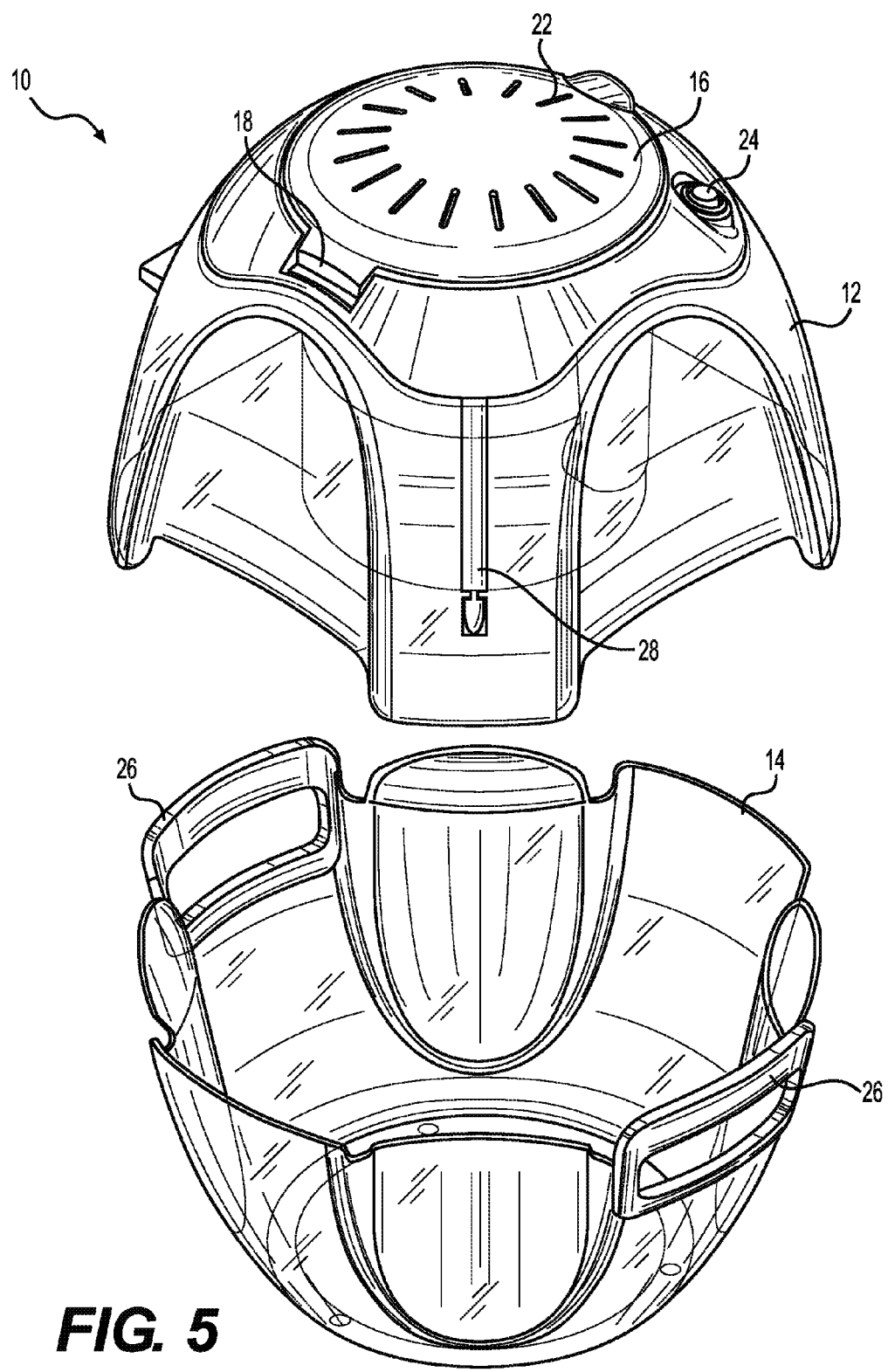
FIG. 5 is a rear perspective view of the kitchen appliance of FIG. 1, showing the top housing portion separated from the bottom housing portion.
Figure 6:
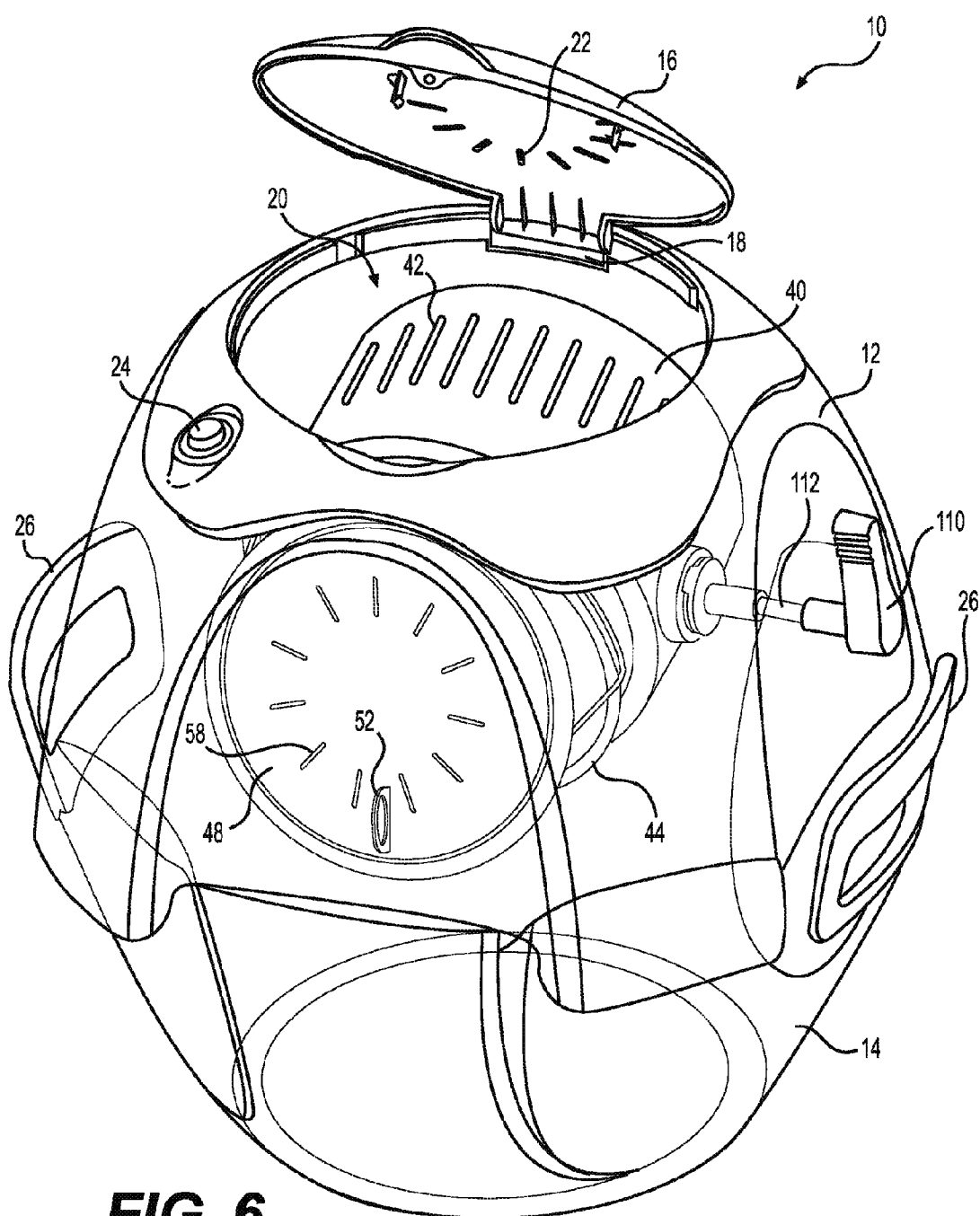
FIG. 6 is a front perspective view of the kitchen appliance of FIG. 1, showing the popping mechanism rotated into position to empty its contents into the bottom housing portion.

Referring to FIGS. 1-6, the kitchen appliance 10 includes a housing that, when assembled as shown in FIGS. 1-6, encloses a popping mechanism that receives and heats unpopped popcorn kernels and cooking oil in order to cause the unpopped popcorn kernels to pop. FIG. 1 is a rear perspective view kitchen appliance 10. FIG. 2 is a front perspective view of kitchen appliance 10. FIG. 3 is front view of kitchen appliance 10. FIG. 4 is a right side view of kitchen appliance 10. FIG. 5 is a rear perspective view of kitchen appliance 10, showing the top housing portion separated from the bottom housing portion. FIG. 6 is a front perspective view of kitchen appliance 10, showing the popping mechanism rotated into position to empty its contents into the bottom housing portion.

The housing comprises a bottom housing portion 14 and a top housing portion 12 that is selectively removable from bottom housing portion 14. Bottom housing portion 14 is adapted to sit stably upon a surface (e.g., a counter) during operation of the appliance. Top housing portion 12 is adapted to sit stably upon bottom housing portion 14 during operation of appliance 10. Top housing portion 12 is selectively removable from bottom housing portion 14 (seen in FIG. 5) to access the popped popcorn and for cleaning and storage. Advantageously, bottom housing portion 14 receives and holds popcorn that has been popped by the appliance, and, when separated from top housing portion 12, may function as a serving bowl to serve the popcorn. In that regard, bottom housing portion 14 is generally bowl-shaped in that bottom housing portion 14 comprises a floor and at least one sidewall (which may be sloped outward from the floor, as illustrated), thereby forming a cavity for receiving, holding, and serving popped popcorn. Bottom housing portion 14 may have a generally frusto-hemispherical shape as illustrated. Bottom housing portion 14 may have a generally smooth sidewall, or may have a contoured sidewall as illustrated. Top housing portion 12 may be generally "bullet" shaped, as illustrated, such that the top surface is generally hemispherical while the sidewall portion is more vertical. The sidewall portion of top housing portion 12 may be generally smooth, or may be contoured as illustrated. Such contouring of the sidewall portions of top housing portion 12 and bottom housing portion 14 potentially provide several advantages. First, such contouring may provide strength and rigidity to the components. Second, such contouring may provide more visual interest than a smooth sidewall. Third, complementary contouring on top housing portion 12 and bottom housing portion 14 may enable the bottom edge of top housing portion 12 and the top edge of bottom housing portion to interlock when top housing portion 12 sits on bottom housing portion 14 (i.e., one or more portions of the bottom edge of top housing portion 12 are inside of the top edge of bottom housing portion 14 and one or more portions of the top edge of bottom housing portion 14 are inside of the bottom edge of top housing portion 12). Such interlocking reduces or eliminates lateral movement of top housing portion 12 relative to bottom housing portion 14 when top housing portion 12 sits on bottom housing portion 14.

One or more handles may be affixed to appliance 10 to enable a user to easily lift and carry kitchen appliance 10. In the illustrated embodiment of the present disclosure, two handles 26 are affixed to opposing sides of the top edge of bottom housing portion 14. Such handle placement enables a user to easily lift and carry the entire appliance (when assembled) or the bottom housing portion only (when separated from the top housing portion). On/off switch 24 controls activation and deactivation of a heating element and motor, as described further below. An external power cord (not illustrated) exits appliance 10 via channel 28. One or more nonslip feet 30 may be affixed to the bottom surface of bottom housing portion 14

Top housing portion 12 and bottom housing portion 14 may be constructed of a polymeric material, such as an injection molded acrylonitrile butadiene styrene (ABS) material. The ABS material may be desirable due to its relatively smooth surface finish, its ability to readily take on various colors, its high impact and crack resistance, and its ability to be plated with a metallic finish. However, top housing portion 12 and bottom housing portion 14 are not limited to polymeric or injected molded ABS materials, and may be constructed of nearly any generally rigid material that is able to take on the general shape of the top housing portion 12 and bottom housing portion 14 and perform the functionality of top housing portion 12 and bottom housing portion 14 described herein. For example, top housing portion 12 and bottom housing portion 14, and any other components of the kitchen appliance 10, may be constructed of a metallic or like material or combination of materials. Top housing portion 12 and bottom housing portion 14 may be generally or completely opaque, translucent or transparent. In the illustrated embodiment, bottom housing portion 14 is entirely transparent and top housing portion 12 is mostly transparent, except for the uppermost portion which is opaque to obscure mechanical and electrical connections.

The popping mechanism is affixed within top housing portion 12 such that, when top housing portion 12 is separated from bottom housing portion 14 and placed upright on a surface, the popping mechanism does not contact the surface. As the popping mechanism will be very hot immediately after popcorn has been popped, this is an important safety feature that enables a user to separate top housing portion 12 from bottom housing portion 14 to access the popped popcorn without waiting for the popping mechanism to cool. The bottom edge of top housing portion 12 has a plurality of raised sections (best seen in FIG. 7) to allow a user to grasp and lift top housing portion 12 by its bottom edge when top housing portion 12 is sitting on a surface.

The popping mechanism comprises an outer kettle 40 and an inner kettle 44, suspended inside top housing portion 12 via first and second support arms 116, 118. The structure and function of the popping mechanism is described further below.

Opening 20 (seen in FIGS. 2 and 6) is defined in the top of top housing portion 12. Opening 20 is aligned with the opening in the top of inner kettle 44 (when inner kettle 44 is in place inside appliance 10 and in its upright position) to enable a user to access inner kettle 44 of the popping mechanism in order to fill inner kettle 44 with unpopped popcorn kernels, and in order to remove inner kettle 44 (using handle 46) for cleaning. Hinged lid 16 is hingedly affixed to top housing portion via hinge 18. Hinged lid 16 is selectively movable between a closed position (seen in FIGS. 1 and 3-5) occluding (i.e., closing off) opening 20 and an open position (seen in FIGS. 2 and 6) not occluding opening 20. When hinged lid 16 is in the open position, the user may reach into opening 20, raise the hinged lid 48 of inner kettle 44 (via handle 52) to access the interior of inner kettle 44, and place unpopped popcorn kernels and oil into inner kettle 44. In an alternative embodiment of the present disclosure (not illustrated), the hinged lid of the top housing portion is selectively removable from the top housing portion via a snap-fit connection. In another alternative embodiment of the present disclosure (not illustrated), the lid of the top housing portion is not hingedly affixed to the top housing portion but rather selectively removable from the top housing portion via a snap-fit connection, a threaded connection, or any other suitable connection that enables the lid to be selectively removed. In an alternative embodiment of the present disclosure (not illustrated), a measuring cup (for measuring unpopped popcorn kernels) may be selectively removably affixed to the underside of hinged lid 16 for storage. In such an alternative embodiment, two or more securing clips may extend downward from the underside of hinged lid 16 such that a measuring cup may be positioned between the securing clips in order to selectively secure the measuring cup to hinged lid 16.

A plurality of vent holes 22 are define in hinged lid 16 to enable excess heat to escape from the interior of appliance 10. Additionally or alternatively, vent holes may be defined in other areas of top housing portion 12 (not illustrated).

The popping mechanism is selectively pivotable between an upright position (seen in FIGS. 1-5) for receiving unpopped popcorn kernels and holding the unpopped popcorn kernels while heat is applied to the inner kettle (as described further below) and a dispensing position (seen in FIG. 6) for emptying popped popcorn into bottom housing portion 14. The popping mechanism is selectively pivoted via dump lever 110 that may be selectively rotated by a user. Dump lever 110 may be selectively removably affixed to the popping mechanism via a snap-fit connection, as described further below. The popping mechanism is typically selectively pivotable approximately 135-150 degrees from its upright position to enable the popped popcorn to be readily emptied into bottom housing portion 14. When the popping mechanism is in the dispensing position, hinged lid 48 of inner kettle 44 swings open (at least partially) (seen in FIG.

6) to allow any popped and/or unpopped popcorn kernels to fall out of inner kettle 44 and into bottom housing 14. When the popping mechanism is returned to its upright position, hinged lid 48 of inner kettle 44 returns to its closed position due to gravity.

Although hinged lid 16 of top housing 12 will typically be closed during operation of appliance 10, hinged lid 16 is shown open in FIG. 6 to provide visibility to the plurality of vent holes 42 defined in the wall of outer kettle 40 to enable excess heat to escape therefrom.

Figure 7:
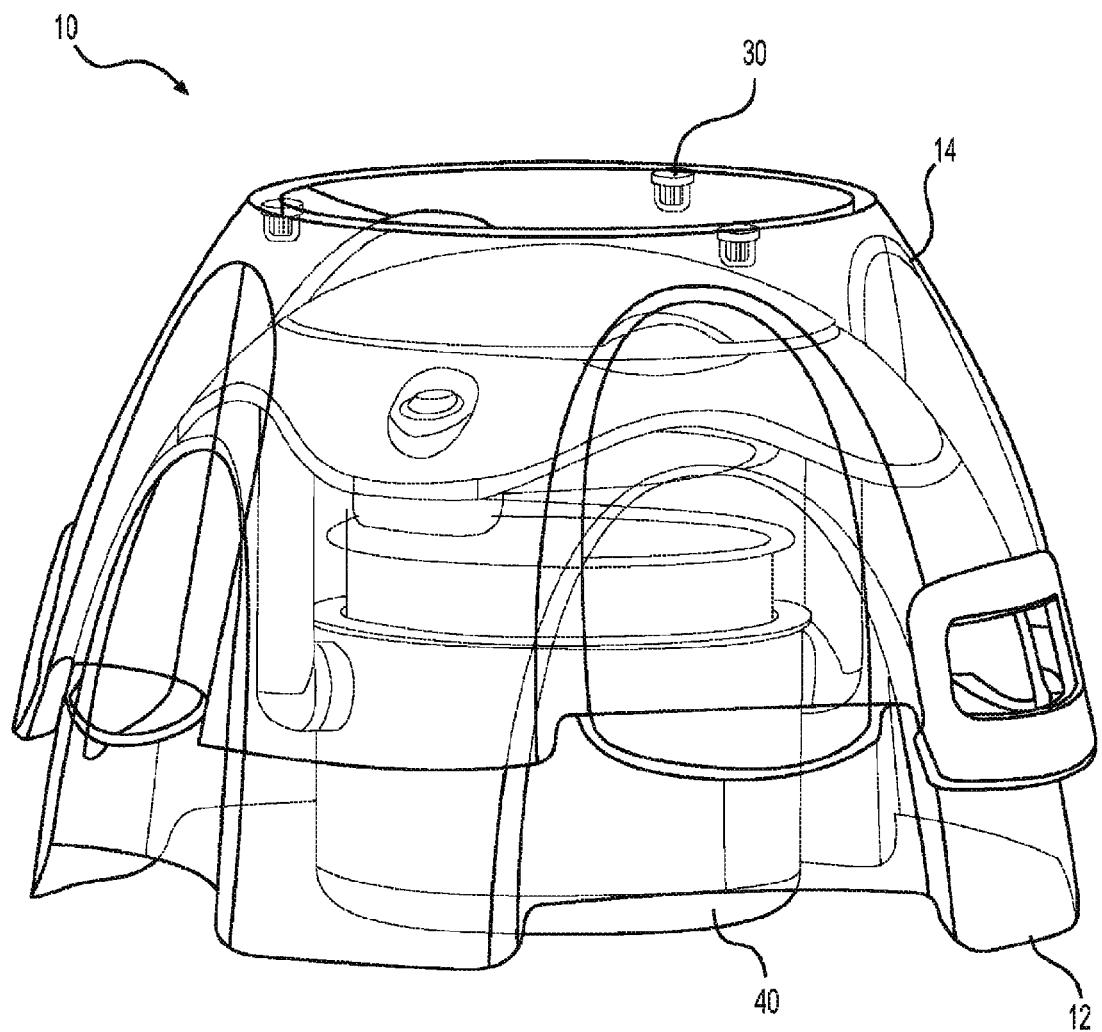
FIG. 7 is a front perspective view of the kitchen appliance of FIG. 1, showing the bottom housing portion inverted and nested on top of the top housing portion for storage.

Referring now to FIG. 7, top housing portion 12 and bottom housing portion 14 are shaped and sized such that bottom housing portion 14, when inverted, is nestable on top of the top housing portion 12 when upright. Similarly, top housing portion 12, when inverted, is nestable within bottom housing portion 14 when upright (not illustrated). Any reference herein to the nesting or nestability of top housing portion 12 and bottom housing portion 14 is intended to describe either of these two arrangements. Such nesting enables easy storage of kitchen appliance 10. It may be necessary to remove dump lever 110 to enable such nesting.

Figure 8:
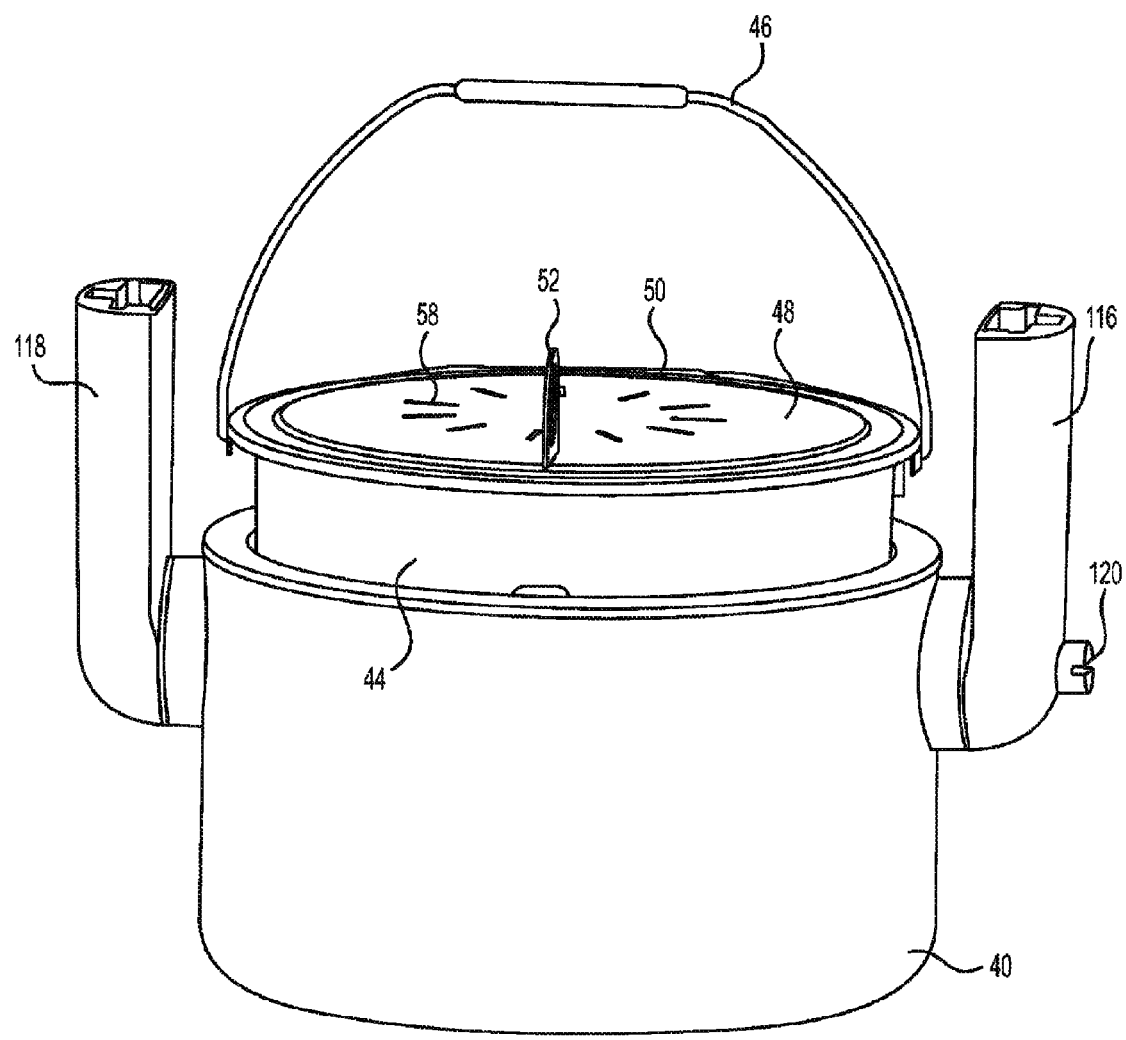
FIG. 8 is a front perspective view of the popping mechanism of the kitchen appliance of FIG. 1, separated from the housing.

Referring now to FIG. 8, the popping mechanism is illustrated removed from the housing. The popping mechanism comprises an outer kettle 40 and an inner kettle 44. Inner kettle 44 is selectively nested in outer kettle 40 (seen in FIG. 8) and selectively removable from the outer kettle 40 (outer kettle 40 is seen separately in FIG. 9 and inner kettle 44 is seen separately in FIG. 10). As discussed above, inner kettle 44 receives unpopped popcorn kernels and holds the unpopped popcorn kernels while heat is applied to inner kettle 44 by a heating element (described further below) disposed in outer kettle 40 in order to cause the unpopped popcorn kernels to pop.

Kitchen appliance 10 further comprises a first support arm 116 and a second support arm 118, each comprising a proximal end and a distal end. The proximal ends of each of the first and second support arms are affixed to an inside surface of top support housing 12 (not illustrated). The popping mechanism (and specifically outer kettle 40) is pivotably affixed to the distal ends of first and second support arms 116, 118.

Figure 9:
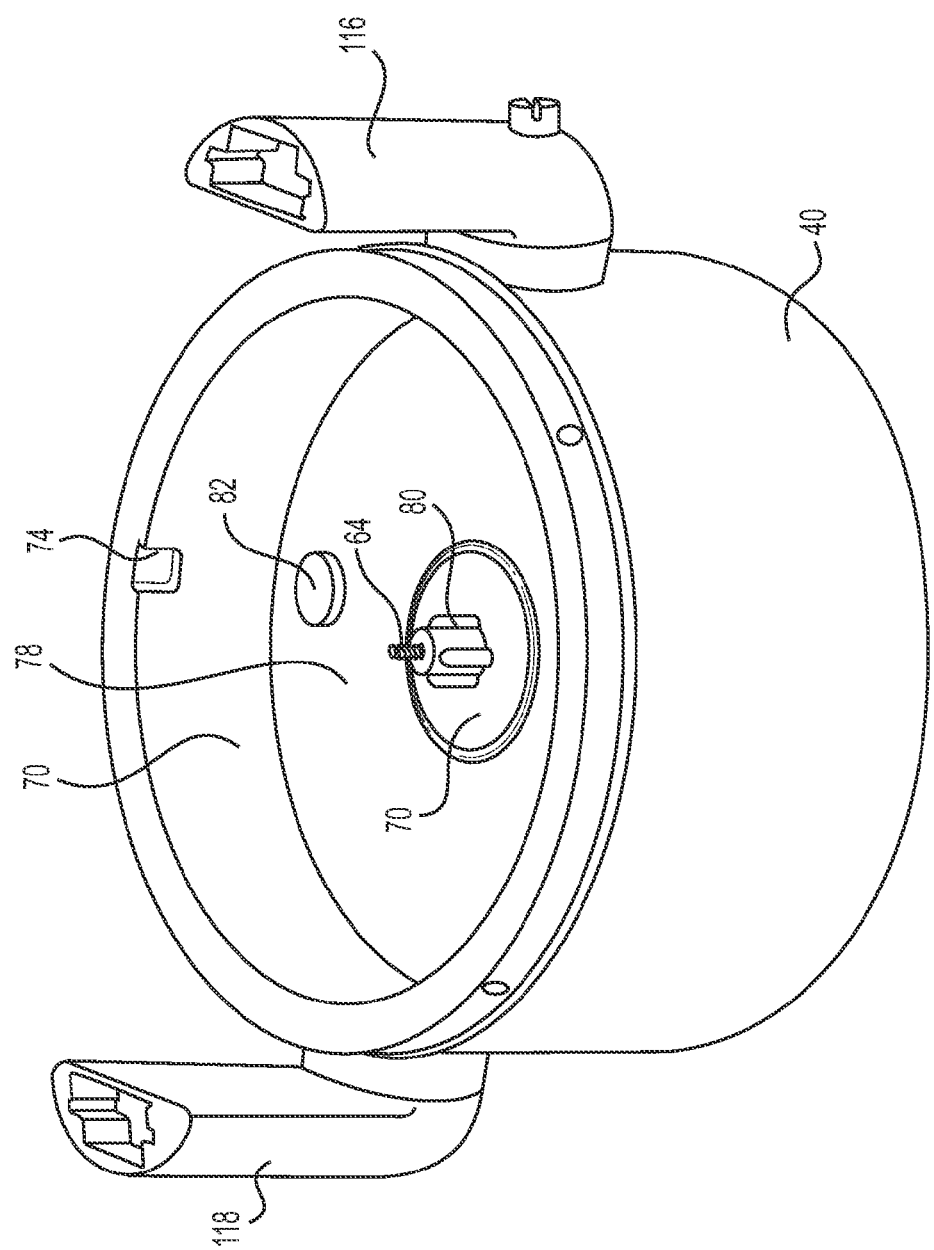
FIG. 9 is a front perspective view of the outer kettle of the popping mechanism of the kitchen appliance of FIG. 1.
Figure 13:
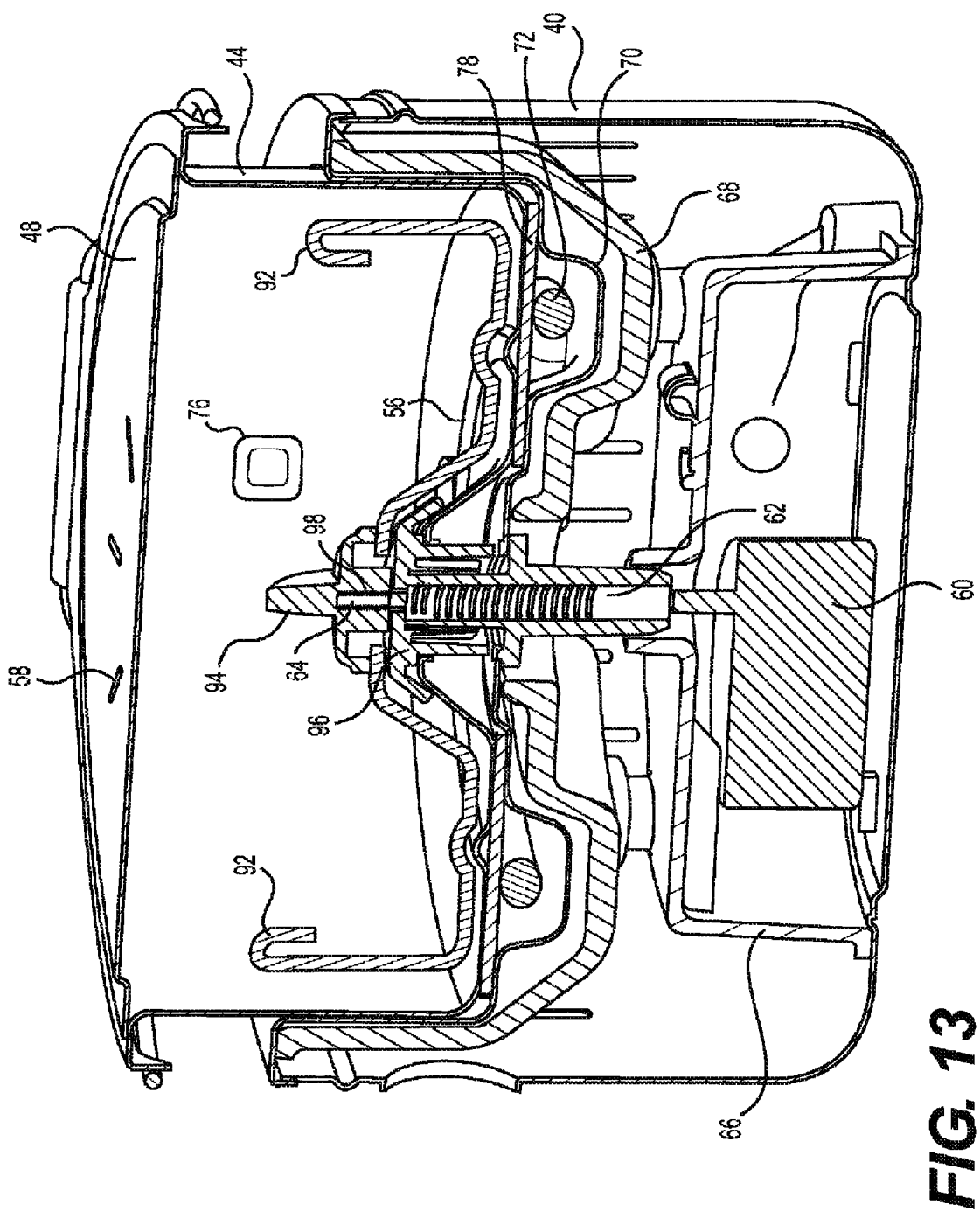
FIG. 13 is a sectional view of the popping mechanism of the kitchen appliance of FIG. 1, separated from the housing.
Figure 14:
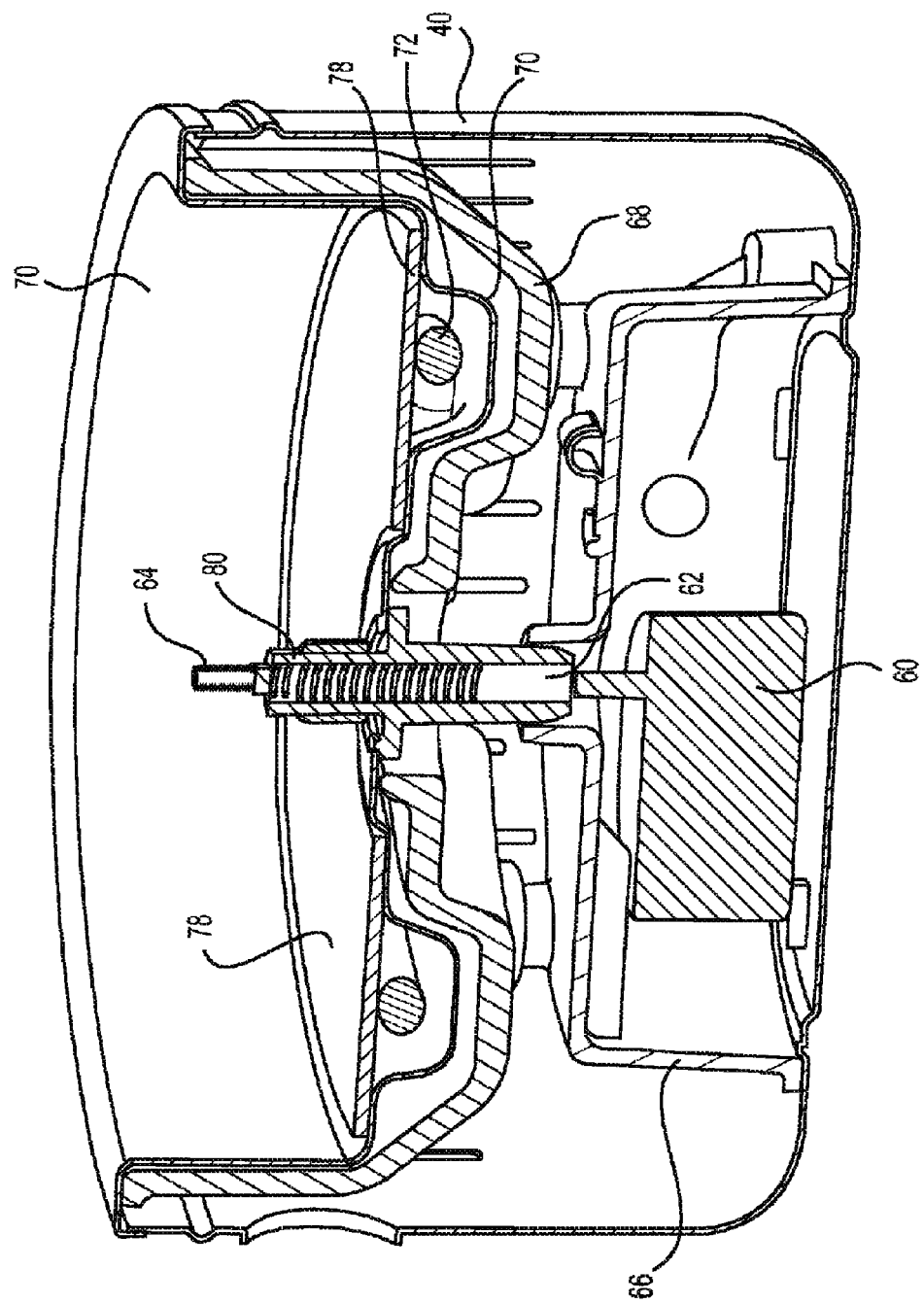
FIG. 14 is a sectional view of the outer kettle of the popping mechanism of the kitchen appliance of FIG. 1.

Referring now to FIG. 9, inner kettle 44 has been removed from the popping mechanism and outer kettle 40 is illustrated. As seen in FIG. 9, a chamber is defined within outer kettle 40 into which inner kettle 44 may selectively nest. The inner and outer kettles are sized such that inner kettle 44 nests snugly within outer kettle 40. Outer kettle 40 comprises several layered components which are described further below and are best seen in FIGS. 13 and 14, but which include inner wall plate 70 which forms the floor and walls of the chamber defined within outer kettle 40 and heating element cover 78 which covers and protects the heating element (described further below).

A synchronous electric motor (seen in FIGS. 13 and 14 and described further below) is mounted within outer kettle 40, below inner wall plate 70. The motor shaft (seen in FIGS. 13 and 14) projects upward from the motor and is aligned with a hole defined in the center of inner wall plate 70. Motor shaft clutch 80 is affixed to the motor shaft, and has a plurality of ribs projecting radially therefrom. In this regard, the motor shaft and motor shaft clutch 80 are directly connected to the motor, rather than via a complex gearing arrangement as is used in conventional kettle popcorn makers. Advantageously, having the motor and motor shaft housed within outer kettle 40 enables the popping mechanism to be rotated to its dispensing position without having to decouple the motor from the shaft as is necessary with conventional kettle popcorn makers. A male threaded rod 64 projects upward from motor shaft clutch 80. For purposes of this disclosure, motor shaft clutch 80 and male threaded rod 64 may be considered components of the motor shaft. A stir rod (seen in FIGS. 11 and 12 and described further below) is selectively affixed to male threaded rod 64. When the motor is energized, the motor shaft rotates and causes motor shaft clutch 80 to rotate, which in turn causes the stir rod to rotate. The rotating stir rod stirs the popcorn kernels while the kernels are being heated, thereby heating the kernels more evenly and increasing the number of kernels that successfully pop.

Figure 10:
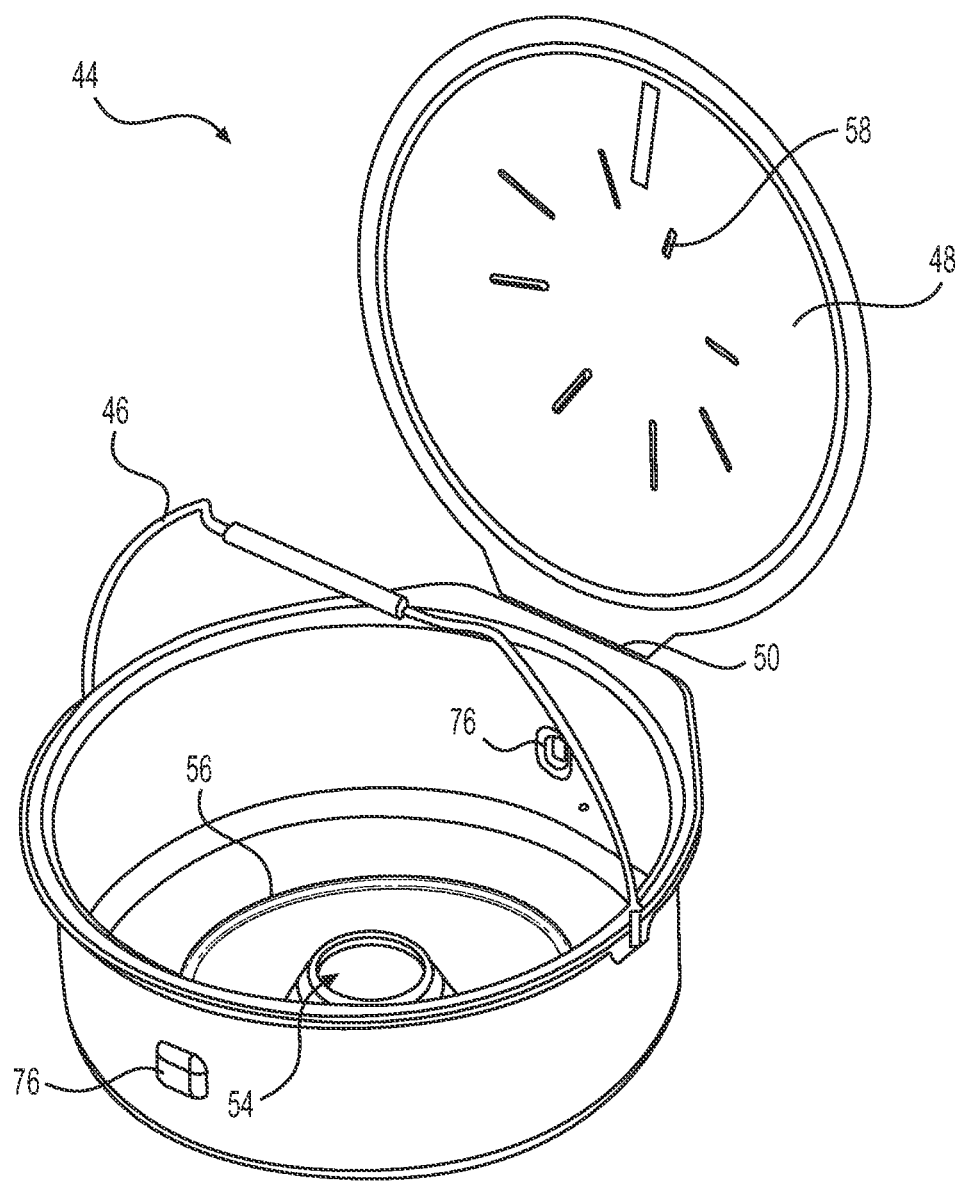
FIG. 10 is a front perspective view of the inner kettle of the popping mechanism of the kitchen appliance of FIG. 1, separated from the popping mechanism.

One or more recesses (one recess 74 is seen in FIG. 9, although the illustrated embodiment of the disclosure will have two such recesses) formed in outer wall 70 of outer kettle 40 receive corresponding ones of protrusions 76 (front and back protrusions are seen in FIG. 10) formed in the wall of inner kettle 44 when inner kettle 44 is nested within outer kettle 40. The mating of corresponding ones of the recesses and protrusions ensures that inner kettle 44 is nested within outer kettle 40 in the correct position and orientation. Thermostat 82 monitors and controls the temperature within the popping mechanism during operation of kitchen appliance 10.

Referring now to FIG. 10, inner kettle 44 is illustrated having been removed from the popping mechanism. Inner kettle 44 comprises a main body that forms a chamber for receiving unpopped popcorn kernels and oil to be heated. A hinged lid 48 is affixed to the main body via hinge 50. A plurality of vent holes 58 are defined within hinged lid 48 to allow excess heat to escape. Handle 46 is pivotably affixed to the main body such that handle 46 may pivot between an up position (seen in FIG. 10) for removing and carrying inner kettle 44 and a down position (seen in FIG. 3) for filling of inner kettle 44 and operation of kitchen appliance 10. One or more handle rests (not illustrated) may project from the main body to support the handle when the handle is in the down position. A circular ridge 56 is formed in the floor of inner kettle 44 to increase strength and rigidity of inner kettle 44. Ridge 56 corresponds to arches formed in the stir rod arms 92 (seen in FIGS. 11 and 12). A hole 54 is defined in a raised area in the center of the floor of inner kettle 44. When inner kettle 44 is in place in kitchen appliance 10, motor shaft clutch 80 and threaded rod 64 are aligned with hole 54, thereby enabling stir rod 90 to be affixed to threaded rod 64 and motor shaft clutch 80.

In operation of kitchen appliance 10, hinged lid 48 may be opened by a user via handle 52 to place unpopped popcorn kernels and oil into inner kettle 44 when inner kettle 44 is in appliance 10. Hinged lid 48 is then closed by the user and kitchen appliance 10 is activated, thereby applying heat to the unpopped popcorn kernels cause the kernels to pop. As the kernels pop, the amount of popped kernels will eventually fill inner kettle 44 and cause hinged lid 48 to lift up such that popped kernels will be pushed out of inner kettle 44 and fall into bottom housing portion 14. When the operation is complete, kitchen appliance 10 is deactivated and dump lever 110 is rotated to rotate the popping mechanism into the dispensing position. As discussed above, when the popping mechanism is in the dispensing position, hinged lid 48 of inner kettle 44 swings open (at least partially) (seen in FIG. 6) to allow any popped and/or unpopped popcorn kernels remaining in inner kettle 44 to fall out of inner kettle 44 and into bottom housing 14. When the popping mechanism is returned to its upright position, hinged lid 48 of inner kettle 44 returns to its closed position.

Advantageously, inner kettle 44 comprises only a single hinged lid, rather than a two-sided hinged lid used in conventional kettle popcorn makers. The single lid of the kitchen appliance of embodiments of the disclosure provides a larger opening into the chamber of the inner kettle, thereby making it easier to clean the inside of the inner kettle. Further advantageously, inner kettle 44 is not electrically connected to any other components of kitchen appliance 10, thereby enabling inner kettle 44 to be removed from kitchen appliance 10 and immersed in water or placed in a dishwasher for cleaning. Conventional kettle popcorn makers have electrical connections to the kettle in which the kernels are popped, such that the kettle of conventional kettle popcorn makers cannot be immersed in water or placed in a dishwasher for cleaning.

Figure 11:
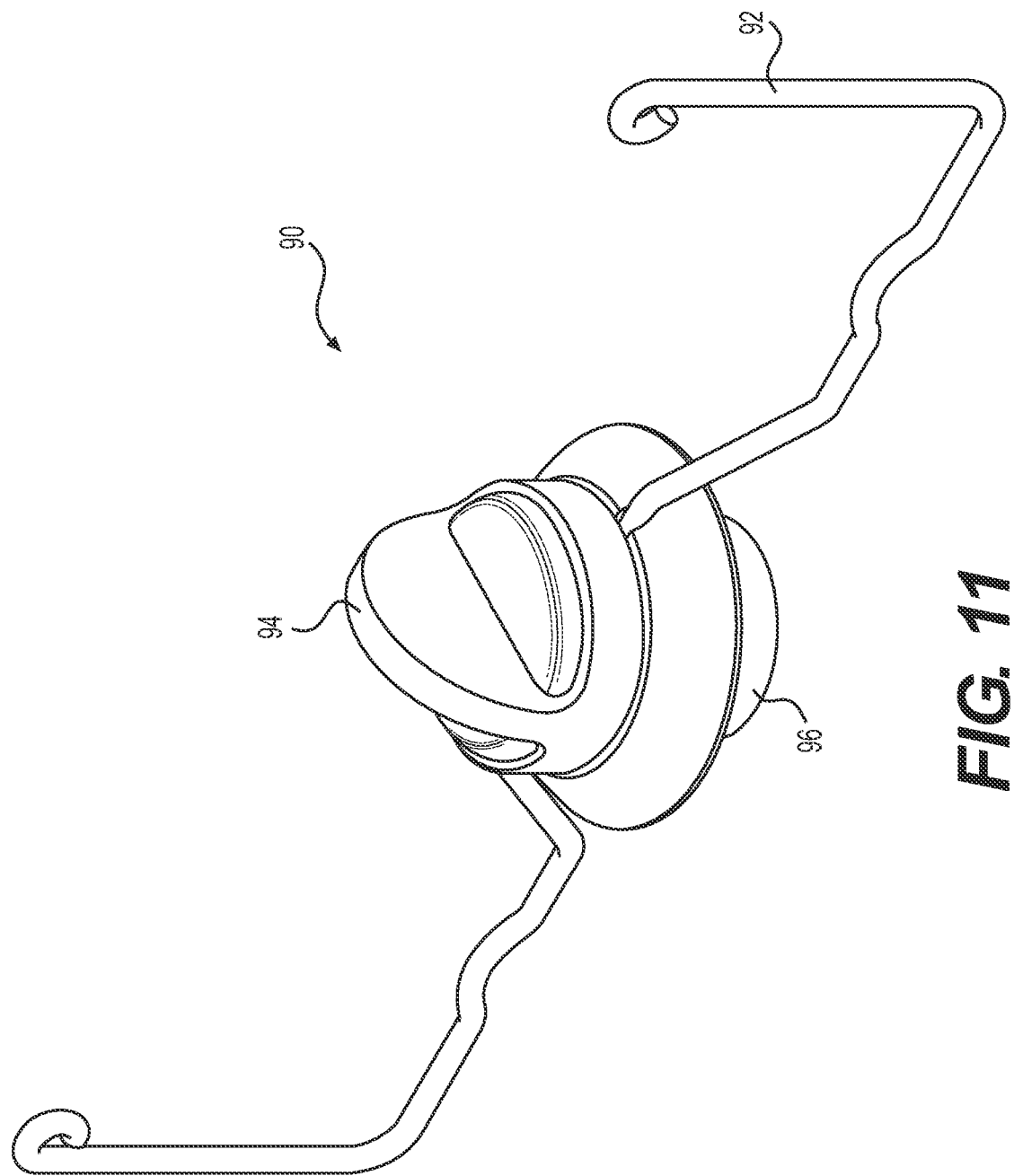
FIG. 11 is a front perspective view of the stir rod of the popping mechanism of the kitchen appliance of FIG. 1, separated from the popping mechanism.
Figure 12:
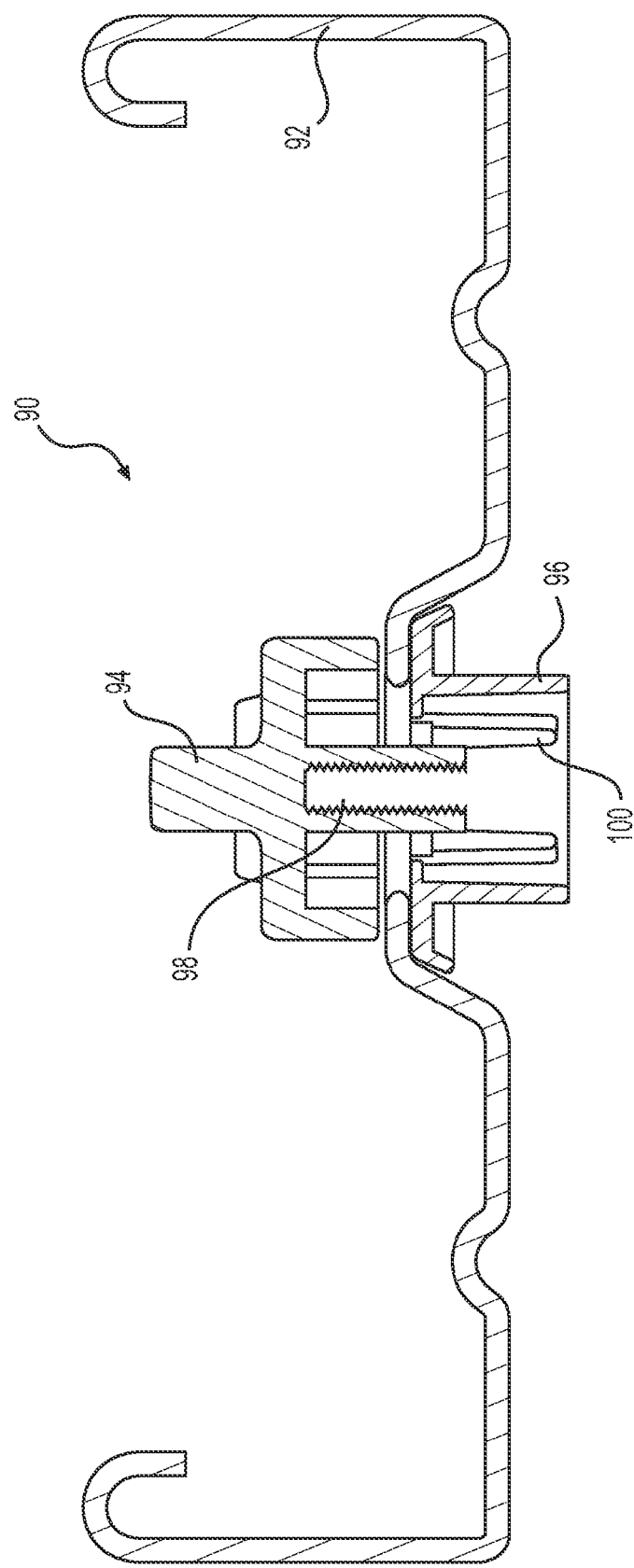
FIG. 12 is a sectional view of the stir rod of FIG. 12.

Referring now to FIGS. 11 and 12, front perspective and sectional views, respectively, of the stir rod of the popping mechanism of kitchen appliance 10 is illustrated. Stir rod 90 is illustrated separated from the popping mechanism. Stir rod 90 comprises a stir rod screw cap 94, a stir rod clutch 96, and one or more stir arms 92. Stir rod screw cap 94, stir rod clutch 96, stir arms 92 are press-fit together and therefore non-removably affixed to each other. Such a one piece stir rod assembly is easier to affix and remove. As seen in FIG. 12, an opening is formed in the bottom of stir rod clutch 96 providing access to an interior chamber having a plurality of ribs 100 that project radially inward and to a female threaded insert 98. The ribs of stir rod clutch 96 correspond to and mate with the ribs of motor shaft clutch 80.

Stir rod 90 is selectively removably affixed to the popping mechanism. Specifically, stir rod 90 is selectively removably affixed to the rotatable shaft of the motor via the motor shaft clutch 80 and threaded rod 64. To affix stir rod 90, stir rod clutch 96 is placed onto motor shaft clutch 80 such that the ribs of each mate. Stir rod screw cap 94 is then rotated clockwise to mate female threaded insert 98 and male threaded rod 64, thereby securely affixing stir rod 90 to the motor shaft. Inner kettle 44 should be in place within outer kettle 40 when stir rod 90 is affixed. Stir rod 90 must be removed from inner kettle 44 in order to remove inner kettle 44 from outer kettle 40. To remove stir rod 90, stir rod screw cap 94 is rotated counterclockwise until female threaded insert 98 and male threaded rod 64 separate and then stir rod 90 is lifted up off motor shaft clutch 80. Stir rod 90 rotates within inner kettle 44 when (i) inner kettle 44 is nested in outer kettle 40, (ii) stir rod 90 is affixed to the rotatable shaft of the motor, and (iii) the motor is rotating its rotatable shaft. The mating ribs of stir rod clutch 96 and motor shaft clutch 80 ensure that any torque exerted on stir rod 90 is transferred to motor shaft clutch 80 (and therefore to the motor) rather than to stir rod screw cap 94.

Referring now to FIGS. 13 and 14 which illustrate sectional views of the popping mechanism with (FIG. 13) and without (FIG. 14) inner kettle 44 in place and stir rod 90 affixed. FIG. 13 illustrates the physical arrangement among outer kettle 40, inner kettle 44, and stir rod 90 when assembled together. Outer kettle 40 comprises an electric motor 60 housed within a protective motor housing 66. Rotatable shaft 62 projects upward from motor 60. Rotatable shaft 62 projects through holes defined in (from bottom to top) insulating plate 68 (which insulates motor 60 from heating element 72), inner wall plate 70 (which, as described above, forms the floor and walls of the chamber defined within outer kettle 40), and heating element cover 78 (which covers and protects heating element 72). Heating element 72 sits within a channel defined in inner wall plate 70.

As seen in FIG. 13, a portion of the rotatable shaft (specifically male threaded rod 64 and a portion of motor shaft clutch 80) projects upward through hole 54 defined in the bottom of inner kettle 44 and a portion of stir rod 90 (specifically stir rod clutch 96) projects downward through hole 54 (alternatively, either a portion of the rotatable shaft or a portion of stir rod 90, but not both, may project through hole 54). As seen in FIG. 13, male threaded rod 64 is mated with threaded female insert 98.

Internal electrical leadwires (typically either hot/neutral or hot/neutral/ground) (not illustrated) are routed from power switch 24 to motor 60 and heating element 72 through a channel (not illustrated) defined in one of the first and second support arms 116, 118. As such, there are no exposed electrical cords or wiring inside the housing of kitchen appliance 10, which enables easier cleaning and reduces the chance of damage to any electrical wiring. Conventional kettle popcorn makers have a power cord that is exposed inside the cabinet.

Figure 15B:
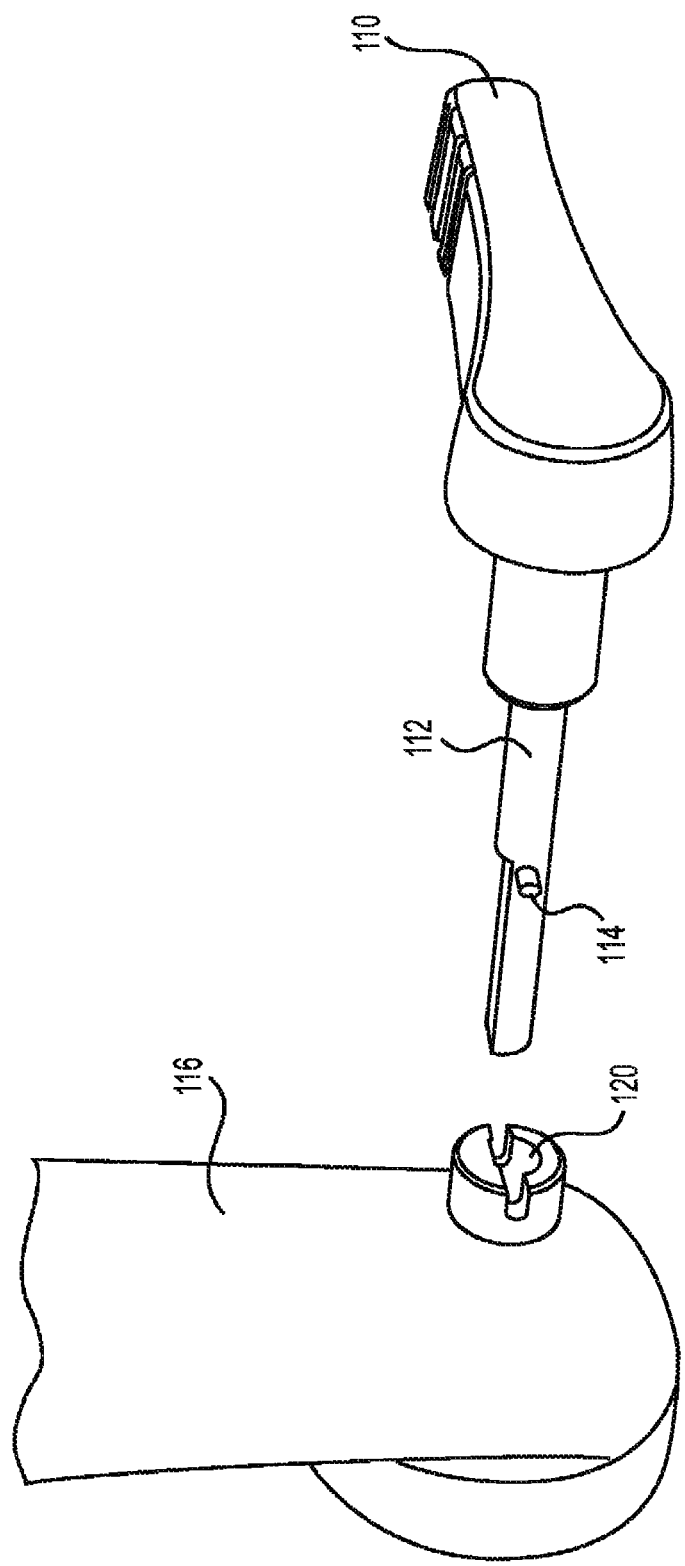
FIG. 15B is a perspective view of the dump lever of FIG. 14, in a disengaged position.

Referring now to FIGS. 15A and 15B, dump lever 110 is illustrated, respectively, in an engaged position and a disengaged position. The popping mechanism is selectively pivoted via dump lever 110 which may be selectively rotated by a user. Dump lever 110 is selectively removably affixed to the popping mechanism via a snap-fit connection. Dump lever 110 comprises dump lever rod 112 which is selectively removably insertable into recess 120 and dump lever rod pin 114 that is perpendicular to dump lever rod 112. To affix dump lever 110, dump lever rod 112 is inserted through a hole defined in the top housing (not illustrated) and into recess 120 until dump lever rod pin 114 is seated firmly into the opposing side channels of recess 120. The distal end of dump lever rod 112 and recess 120 have corresponding semi-circular shapes which ensure that dump lever rod 112 can only be inserted into recess 120 in one orientation. When dump lever rod 112 is inserted into recess 120, and rotational movement of dump lever 110 is translated to the popping mechanism to correspondingly rotate the popping mechanism. To remove dump lever 110, dump lever 110 is simply firmly pulled out.

In alternative embodiment of the present disclosure (not illustrated), the dump lever has a hollow dump lever rod that slidably engages with an arm that projects outward from a rotating bracket. The rotating bracket is rotatably affixed to one of the support arms and non-movably affixed to the outer kettle such that rotational movement of the dump lever is translated to the rotating bracket and then to the popping mechanism to correspondingly rotate the popping mechanism. In such an embodiment, the rotating bracket arm may comprise a resilient protrusion that mates with a corresponding recess defined in the dump lever rod such that the dump lever rod may be selectively removably affixed to the rotating bracket arm. Alternatively, the dump lever rod may comprise a resilient protrusion that mates with a corresponding recess defined in the rotating bracket arm.

A preferred method of operating the kitchen appliance 10 to pop popcorn therein includes a user opening hinged lid 16 of top housing portion 12 and hinged lid 48 of inner kettle 44 and adding oil and a desired quantity of unpopped popcorn kernels to inner kettle 44. Hinged lid 48 and hinged lid 16 are then closed and kitchen appliance 10 is activated via power switch 24. The user waits until a desired amount of the unpopped popcorn kernels have popped. This is typically determined by waiting until about two seconds elapse between each pop. At least a portion of the popped popcorn will have fallen into bottom housing portion 14 at this point. After the desired amount of the unpopped popcorn kernels have popped, kitchen appliance 10 is deactivated via power switch 24. The user rotates dump lever 110 to pivot the popping mechanism from the upright position to the dispensing position such that any popped popcorn remaining in inner kettle 44 falls into bottom housing portion 14. Top housing portion 12 may then be removed from bottom housing portion 14 and the popped popcorn may be served from bottom housing portion 14.

Once cooled, inner kettle 44 may be removed from kitchen appliance 10 and cleaned by submersing in water or washing in a dishwasher. Bottom housing portion 14 may also be cleaned by submersing in water or washing in a dishwasher. Once all components are cleaned, bottom housing portion 14 may be inverted and nested on top of top housing portion 12 for storage.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A kitchen appliance for popping popcorn comprising:
    a bottom housing portion adapted to be placed on a counter, the bottom housing portion comprising a floor and at least one sidewall, the floor and the at least one sidewall forming a cavity for receiving and holding popped popcorn;
    a top housing portion supported by the bottom housing portion during use and selectively removable from the bottom housing portion; and
    a popping mechanism comprising a kettle operable to hold unpopped popcorn kernels, the popping mechanism affixed within the top housing portion such that, when the top housing portion is selectively removed from the bottom housing portion and placed upright on the counter, all of the popping mechanism does not contact the counter;
    wherein the popping mechanism is selectively pivotable between an upright position for receiving the unpopped popcorn kernels and holding the unpopped popcorn kernels while heat is applied to the popping mechanism by a heating element, the heating element operable to heat the unpopped popcorn in order to cause the unpopped popcorn kernels to pop, and a dispensing position for emptying popped popcorn from the popping mechanism into the bottom housing portion.

2. The kitchen appliance according to claim 1, wherein the popping mechanism comprises:
    an outer kettle which houses the heating element and a motor; and
    an inner kettle selectively nested in the outer kettle and selectively removable from the outer kettle, the inner kettle adapted to receive the unpopped popcorn kernels and hold the unpopped popcorn kernels while heat is applied to the inner kettle by the heating element in order to cause the unpopped popcorn kernels to pop.

3. The kitchen appliance according to claim 2, wherein the inner kettle comprises a single hinged lid selectively movable between a closed position occluding an opening defined in a top of the inner kettle and an open position not occluding the opening defined in the top of the inner kettle.

4. The kitchen appliance according to claim 3, wherein the hinged lid occludes the opening defined in the top of the inner kettle when the popping mechanism is in its upright position and does not occlude the opening defined in the top of the inner kettle when the popping mechanism is in its dispensing position.

5. The kitchen appliance according to claim 3, wherein an opening is defined in the top housing portion, the opening in the top housing portion being aligned with the opening defined in the top of the inner kettle when the popping mechanism is in its upright position, the opening defined in the top housing for enabling user access to the opening defined in the top of the inner kettle.

6. The kitchen appliance according to claim 2, wherein the popping mechanism further comprises a rotatable shaft directly connected to the motor and aligned with a hole defined in a bottom of the inner kettle when the inner kettle is nested in the outer kettle.

7. The kitchen appliance according to claim 6, wherein the popping mechanism further comprises a stir rod selectively removably affixed to the rotatable shaft within the inner kettle such that the stir rod rotates within the inner kettle when (i) the inner kettle is nested in the outer kettle, (ii) the stir rod is affixed to the rotatable shaft, and (iii) the motor is rotating the rotatable shaft; and
    wherein a portion of the rotatable shaft projects through the hole defined in the bottom of the inner kettle when the inner kettle is nested in the outer kettle and/or a portion of the stir rod projects through the hole defined in the bottom of the inner kettle when the inner kettle is nested in the outer kettle and when the stir rod is affixed to the rotatable shaft.

8. The kitchen appliance according to claim 7, wherein the stir rod comprises a screw cap and one or more stir arms non-removably affixed to the screw cap.

9. The kitchen appliance according to claim 2, wherein the appliance further comprises:
    a power switch;
    internal electrical leadwires to carry electrical power from the power switch to the motor and heating element;
    an external power cord to carry electrical power from an electric power source to the power switch; and
    first and second support arms each comprising a proximal end and a distal end, the proximal ends of each of the first and second support arms being affixed to an inside surface of the top housing;
    wherein the popping mechanism is pivotably affixed to the distal ends of the first and second support arms; and
    wherein the electrical leadwires are routed from power switch to the motor and heating element through a channel defined in one of the first and second support arms.

10. The kitchen appliance according to claim 2, wherein the inner kettle is not electrically connected to any other components of the kitchen appliance.

11. The kitchen appliance according to claim 1, wherein the appliance further comprises:
    a dump lever selectively rotatable by a user to selectively pivot the popping mechanism between the upright position and the dispensing position, the dump lever being selectively removably affixed to the popping mechanism via a snap-fit connection.

12. The kitchen appliance according to claim 1, wherein the top housing portion and the bottom housing portion are shaped and sized such that the bottom housing portion, when inverted, is nestable on top of the top housing portion, when upright and/or such that the top housing portion, when inverted, is nestable within the bottom housing portion, when upright.

13. A kitchen appliance for popping popcorn comprising:
a bowl adapted to be placed on a counter and for receiving, holding, and serving popped popcorn;
a top housing portion supported by the bowl during use and selectively removable from the bowl; and
a popping mechanism comprising a kettle operable to hold unpopped popcorn kernels, the popping mechanism affixed within the top housing portion such that, when the top housing portion is selectively removed from the bowl and placed upright on the counter, all of the popping mechanism does not contact the counter;
wherein the popping mechanism is selectively pivotable between an upright position for receiving the unpopped popcorn kernels and holding the unpopped popcorn kernels while heat is applied to the popping mechanism by a heating element, the heating element operable to heat the unpopped popcorn in order to cause the unpopped popcorn kernels to pop, and a dispensing position for emptying popped popcorn from the inner kettle into the bowl.

\* \* \* \* \*